United States Patent
Gupta et al.

(10) Patent No.: US 12,026,072 B2
(45) Date of Patent: Jul. 2, 2024

(54) METERING FRAMEWORK FOR IMPROVING RESOURCE UTILIZATION FOR A DISASTER RECOVERY ENVIRONMENT

(71) Applicant: Nutanix, Inc., San Jose, CA (US)

(72) Inventors: Abhishek Gupta, Ghaziabad (IN); Bhushan Pandit, Pune (IN); Pranab Patnaik, Cary, NC (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/675,263

(22) Filed: Feb. 18, 2022

(65) Prior Publication Data

US 2023/0205653 A1 Jun. 29, 2023

(30) Foreign Application Priority Data

Dec. 24, 2021 (IN) .............................. 202141060697

(51) Int. Cl.
*G06F 11/00* (2006.01)
*G06F 11/14* (2006.01)
*G06F 11/20* (2006.01)

(52) U.S. Cl.
CPC ...... *G06F 11/2035* (2013.01); *G06F 11/1435* (2013.01); *G06F 11/1464* (2013.01); *G06F 11/1469* (2013.01); *G06F 2201/84* (2013.01)

(58) Field of Classification Search
CPC ............. G06F 11/2035; G06F 11/1435; G06F 11/1464; G06F 11/1469; G06F 2201/84
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |

(Continued)

OTHER PUBLICATIONS

Cano, Ignacio, "Curator: Self-Managing Storage for Enterprise Clusters" University of Washington; published Mar. 2017; pp. all.

(Continued)

*Primary Examiner* — Loan L. T. Truong
(74) *Attorney, Agent, or Firm* — Cesari and McKenna, LLP

(57) ABSTRACT

A framework is described that improves resource utilization during operations executing within workflows of the distributed data processing system (e.g., having a plurality of interconnected nodes) in a disaster recovery (DR) environment configured to support synchronous and asynchronous (i.e., heterogeneous) DR workflows (e.g., generating snapshots and replicating data) that include synchronous replication, asynchronous replication, nearsync (i.e., short duration snapshots of metadata) replication and migration of data objects associated with the workflows for failover (e.g., replication and/or migration) to a secondary site in the event of failure of the primary site. The framework meters (regulates) execution of the operations directed to the workloads so as to efficiently use the resources in a manner that allows timely progress (completion) of certain (e.g., high-frequency) operations and reduction in blocking (stalling) of other (e.g., low-frequency) operations by avoiding unnecessary resource hoarding/consumption and contention. Notably, the framework also provides metering and tuning of properties during execution of the workflows and maintains their state to provide for recovery.

26 Claims, 5 Drawing Sheets

(56) References Cited

U.S. PATENT DOCUMENTS

| | | | |
|---|---|---|---|
| 8,850,130 B1 | 9/2014 | Aron et al. | |
| 8,863,124 B1 | 10/2014 | Aron et al. | |
| 9,009,106 B1 | 4/2015 | Aron et al. | |
| 9,069,708 B2 | 6/2015 | Gill et al. | |
| 9,336,132 B1 | 5/2016 | Aron et al. | |
| 9,448,894 B1* | 9/2016 | Barcello | G06F 16/25 |
| 9,652,265 B1 | 5/2017 | Narayanasamy et al. | |
| 9,747,287 B1 | 8/2017 | Bhardwaj et al. | |
| 9,772,866 B1 | 9/2017 | Aron et al. | |
| 10,740,287 B2* | 8/2020 | Haviv | G06F 3/0685 |
| 11,436,097 B1 | 9/2022 | Kumar et al. | |
| 11,669,409 B2* | 6/2023 | Wang | G06F 11/203 |
| | | | 714/19 |
| 2002/0143847 A1* | 10/2002 | Smith | G06F 9/4881 |
| | | | 718/103 |
| 2003/0028583 A1* | 2/2003 | Flores | G06F 9/5083 |
| | | | 718/105 |
| 2006/0095686 A1* | 5/2006 | Miller | G06F 3/0659 |
| | | | 711/151 |
| 2006/0280119 A1* | 12/2006 | Karamanolis | G06F 9/5038 |
| | | | 370/465 |
| 2008/0154979 A1* | 6/2008 | Saitoh | G06F 11/1464 |
| 2010/0030931 A1* | 2/2010 | Balasubramanian | |
| | | | G06F 3/0611 |
| | | | 710/39 |
| 2011/0126047 A1* | 5/2011 | Anderson | H04L 63/08 |
| | | | 709/224 |
| 2013/0227111 A1 | 8/2013 | Wright et al. | |
| 2015/0277987 A1 | 10/2015 | Di Balsamo et al. | |
| 2018/0321971 A1 | 11/2018 | Bahramshahry et al. | |
| 2020/0186475 A1 | 6/2020 | Nayak et al. | |
| 2020/0396286 A1 | 12/2020 | Nallathambi et al. | |
| 2020/0403920 A1 | 12/2020 | Thanasekaran | |
| 2020/0409769 A1* | 12/2020 | Carroll | G06F 11/3433 |
| 2021/0026704 A1 | 1/2021 | Nandagopal et al. | |
| 2021/0255788 A1 | 8/2021 | Aggarwal et al. | |
| 2021/0286728 A1 | 9/2021 | Jalaparti et al. | |
| 2021/0342214 A1* | 11/2021 | Madawat | G06F 11/3006 |
| 2022/0030901 A1 | 9/2022 | Jiang et al. | |
| 2022/0283902 A1* | 9/2022 | Malamut | G06F 11/1464 |
| 2022/0300530 A1* | 9/2022 | Beier | G06F 11/1471 |
| 2022/0374316 A1 | 11/2022 | Kumar | |
| 2022/0398021 A1* | 12/2022 | Dutta | G06F 3/0653 |
| 2022/0413741 A1* | 12/2022 | Livis | G06F 3/0605 |
| 2023/0056217 A1* | 2/2023 | Rathi | H04L 67/1097 |
| 2023/0080691 A1 | 3/2023 | Gupta et al. | |

OTHER PUBLICATIONS

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible" from https://nutanixbible.com/ Sep. 1, 2020 pp. all.

Citrix XenDesktop 7.1 on Microsoft Hyper-V Server 2012 R2 on Nutanix Virtual Computing Platform Solution Design Citrix Validated Solutions, Jun. 25, 2014, 95 pages.

* cited by examiner

METERING FRAMEWORK FOR IMPROVING RESOURCE UTILIZATION FOR A DISASTER RECOVERY ENVIRONMENT

CROSS-REFERENCE TO RELATED APPLICATIONS

The present application claims the benefit of India Provisional Patent Application Serial No. 202141060697, which was filed on Dec. 24, 2021, by Abhishek Gupta, et al. for METERING FRAMEWORK FOR IMPROVING RESOURCE UTILIZATION FOR A DISASTER RECOVERY ENVIRONMENT, which is hereby incorporated by reference.

BACKGROUND

Technical Field

The present disclosure relates to resource utilization for workflows of a data processing system and, more specifically, to metering operations of workflows for a distributed data processing system in a disaster recovery environment.

Background Information

A distributed data processing system may be configured to provide multiple services having operations configured to implement complex and dynamic workflows. The system may include a cluster of interconnected nodes having resources, such as central processing units (CPUs), memory and networks, which are available for use by the services to implement the workflows. However, there may be cases where the demand for system resources by the services exceeds the available capacities of the resources. Disaster recovery (DR) services are common cases where the workflows (e.g., generating snapshots and replicating data) are long running, have different load and resource demands at various intermediate stages of the workflows, and are typically batched or scheduled together to create high resource demands that could haphazardly exceed system and service capacities.

A typical approach to addressing unpredictable and excessive resource demands include implementing threshold limits or caps on resources allocated to the services at various stages of the workflows. However, such threshold implementations may cause back-pressure build-up due to, e.g., queuing of operation requests of incoming workflows such that the requests cannot be accommodated for a next stage of the workflow and resulting in rejection or timeouts of the incoming (or in-progress) workflows in overwhelming load conditions. Another approach involves reservation of spare resources (bandwidth) to support high priority workflows, which typically requires use of sophisticated prediction logic and/or heuristics particularly with respect to scaling of system resources. However, scaling is generally nonlinear and difficult to predict in advance for distributed systems and any errors or latencies in the prediction logic may result in failures, timeouts, or non-optimal resource consumption if preemption of running stages of the workflows is employed.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
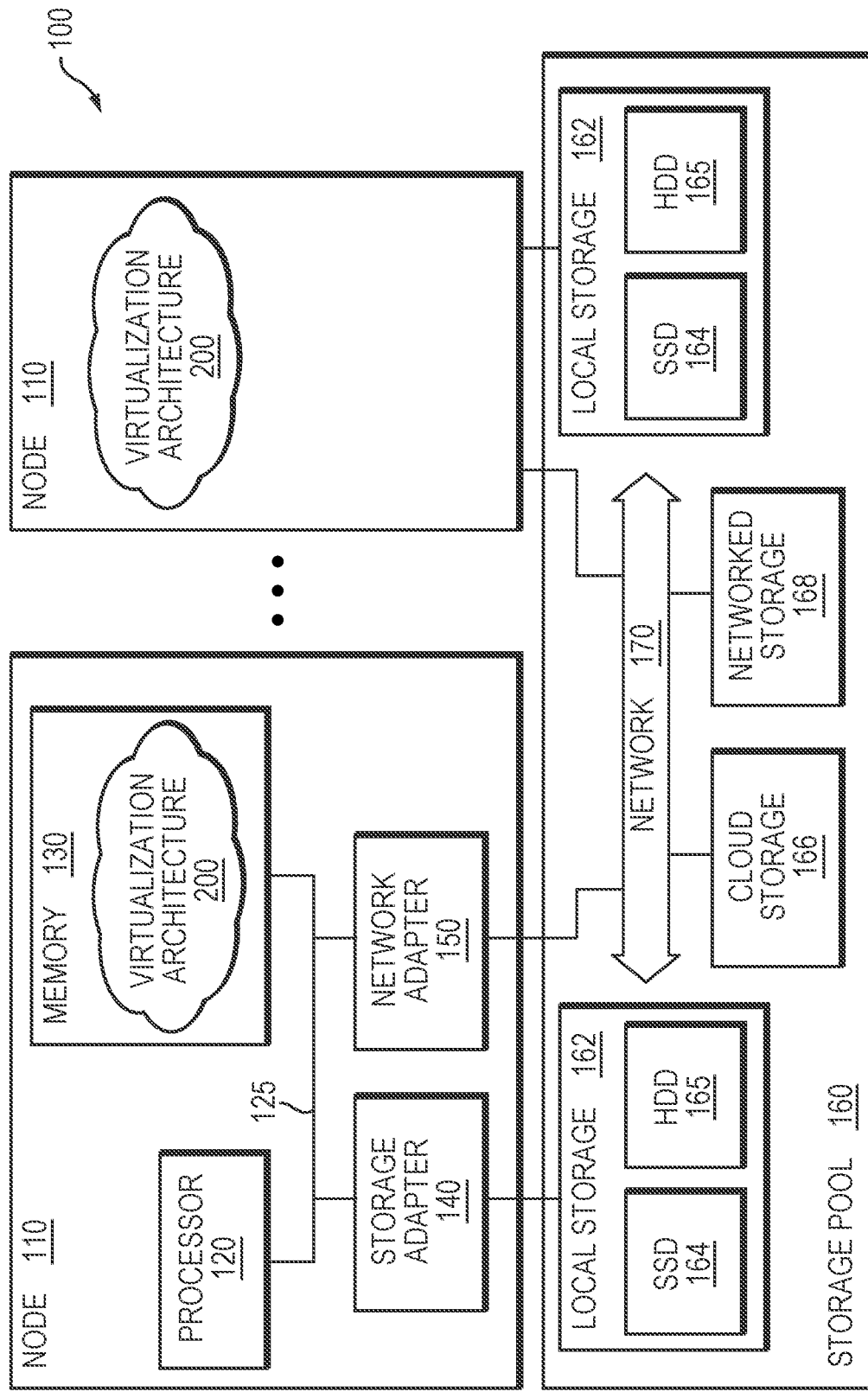
FIG. 1 is a block diagram of a plurality of nodes interconnected as a cluster in a virtualized environment.

The embodiments described herein are directed to a framework configured to improve resource utilization during operations executing within workflows of a distributed data processing system in a disaster recovery (DR) environment. Illustratively, the distributed data processing system is configured as a plurality of nodes interconnected as one or more clusters having resources configured to support synchronous and asynchronous (i.e., heterogeneous) DR workflows (e.g., generating snapshots and replicating data). The system resources of the cluster include central processing units (CPUs), memory and networks, whereas the heterogeneous DR workflows include synchronous replication, asynchronous replication, nearsync (i.e., short duration snapshots of metadata) replication and migration of data objects, such as virtual disks and/or virtual machines. The data objects at a primary site of the DR environment are designated as one or more workloads associated with the workflows for failover (e.g., replication and/or migration) to a secondary site in the event of failure of the primary site. The framework is configured to control and regulate (meter) execution of the operations directed to the workloads so as to efficiently use the resources in a manner that allows timely progress (completion) of certain (e.g., high-frequency) operations and reduction in blocking (stalling) of other (e.g., low-frequency) operations by avoiding unnecessary resource hoarding/consumption and contention. That is, the metering regulates use of resources by predictive and real-time scheduling of operations to manage orderly resource consumption and avoid contention such as typically occurs in the "thundering herd" problem.

In an embodiment, the operations of the DR workflows are organized as jobs metered by a control plane process (e.g., replication manager) of the framework executing on a node of the cluster. Each workload is defined by properties such as (i) load, e.g., a number of virtual disks to be replicated and/or a total amount of changes to be replicated, (ii) priority, e.g., replication priority relative to similar operations having different latency/criticality criteria, wherein the replication priority may be related to a recovery point objective (RPO) associated with a job, and (iii) flow identification, e.g., an identifier (ID) associated with a flow and representing a partition (physical or virtual), such as a secondary site, having independent system capacity for handling the workloads. The replication manager predictively schedules operations based on their properties to determine an estimated time for completion so that resource consumption can be efficiently metered. In this manner, unused resources held by longer running operations are reduced, permitting shorter duration frequent operations to complete from available resources.

The replication manager includes customizable logic (e.g., program instructions) configured to monitor data structures organized as one or more queues and a list of references to the queues. Each queue holds references to pending workflow operations for a flow ID, whereas each element of the list represents a set of operations sharing the same flow ID. The queues and list cooperate to provide a flow queue, i.e., a queue for a given flow ID. A vector of the flow queue may be implemented as a priority queue, wherein each element of the priority queue vector represents a flow queue with specific priority. Each flow queue element in the priority queue is associated with an allowed maximum quota of resource usage that is based on priority associated with a percentage of the total system bandwidth. Notably, the framework described herein combines predictive metering prior to job invocation as well as ongoing metering while the job is running.

DESCRIPTION

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network, which is illustratively an Ethernet local area network (LAN) 170. The network adapter 150 may thus be embodied as a network interface card having the mechanical, electrical and signaling circuitry needed to connect the node 110 to the LAN. In an embodiment, one or more intermediate stations (e.g., a network switch, router, or virtual private network gateway) may interconnect the LAN with network segments organized as a wide area network (WAN) to enable communication between the nodes of cluster 100 and remote nodes of a remote cluster over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network may be effected by exchanging discrete frames or packets of data according to protocols, such as the Transmission Control Protocol/Internet Protocol (TCP/IP) and User Datagram Protocol (UDP), as well as protocols for authentication, such as the OpenID Connect (OIDC) protocol, and other protocols for secure transmission, such as the HyperText Transfer Protocol Secure (HTTPS) may also be advantageously employed.

The main memory 130 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
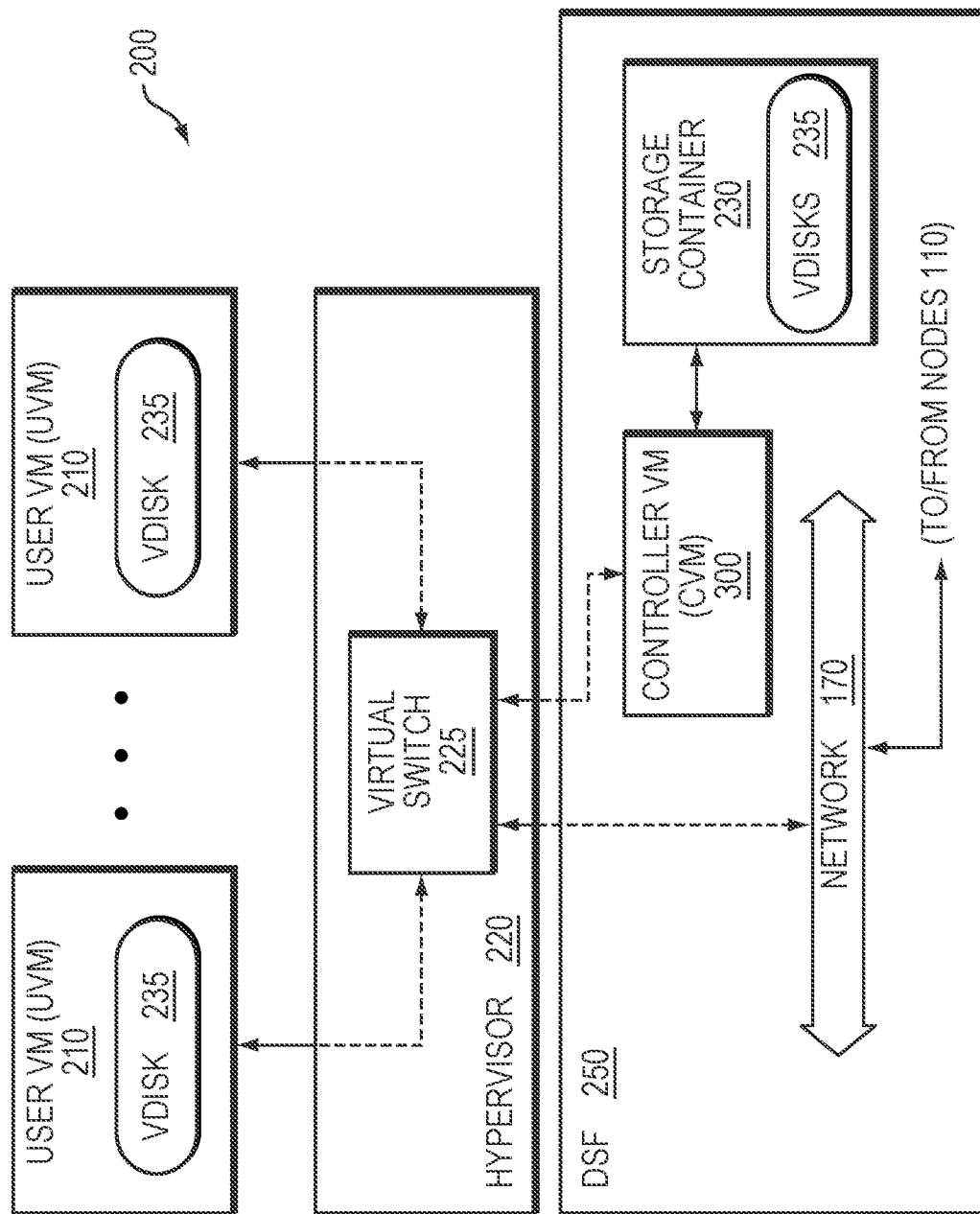
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed data processing system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available cluster wide.

The client software (e.g., applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI, CIFS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably the IP-based storage protocol request packets may remain in the node 110 when the communication—the request and the response—begins and ends within the hypervisor 220. In other embodiments, the IP-based storage protocol request may be routed by the virtual switch 225 to a CVM 300 on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 300 on that node for further processing.

Figure 3:
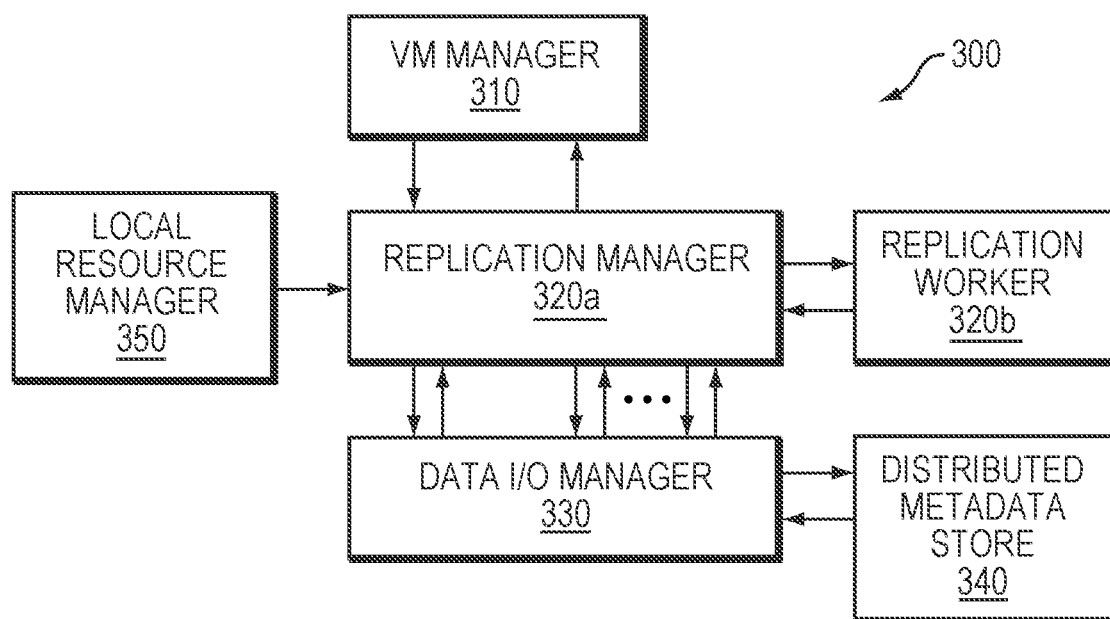
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in a variety of different operating environments due to the broad interoperability of the industry standard IP-based storage protocols (e.g., iSCSI, CIFS, and NFS) supported by the CVM.

Illustratively, the CVM 300 includes a plurality of processes embodied as a storage stack that may be decomposed into a plurality of threads running in a user space of the operating system of the CVM to provide storage and I/O management services within DSF 250. In an embodiment, the user mode processes include a virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node. A local resource manager 350 allows users (administrators) to monitor and manage resources of the cluster. A replication manager 320*a* is configured to provide replication and disaster recovery services of DSF 250 and, to that end, cooperates with the local resource manager 350 to implement the services, such as migration/failover of virtual machines and containers, as well as scheduling of snapshots. In an embodiment, the replication manager 320*a* may also interact with one or more replication workers 320*b*. A data I/O manager 330 is responsible for all data management and I/O operations in DSF 250 and provides a main interface to/from the hypervisor 220, e.g., via the IP-based storage protocols. Illustratively, the data I/O manager 330 presents a vdisk 235 to the UVM 210 in order to service I/O access requests by the UVM to the DFS. A distributed metadata store 340 stores and manages all metadata in the node/cluster, including metadata structures that store metadata used to locate (map) the actual content of vdisks on the storage devices of the cluster.

Data failover generally involves copying or replicating data among one or more nodes 110 of clusters 100 embodied as, e.g., datacenters to enable continued operation of data processing operations in a data replication environment, such as disaster recovery. The data replication environment includes two or more datacenters, i.e., sites, which are typically geographically separated by relatively large distances and connected over a communication network, such as a WAN. For example, data at a local datacenter (e.g., primary site) may be replicated over the network to one or more remote datacenters (e.g., secondary site) located at geographically separated distances to ensure continuity of data processing operations in the event of a failure of the nodes at the primary site.

Synchronous replication may be used to replicate the data between the sites such that each update to the data at the primary site is copied to the secondary site. For instance, every update (e.g., write operation) issued by a UVM 210 to data designated for failover (i.e., failover data) is continuously replicated from the primary site to the secondary site before the write operation is acknowledged to the UVM. Thus, if the primary site fails, the secondary site has an exact (i.e., mirror copy) of the failover data at all times. Synchronous replication generally does not require the use of snapshots of the data; however, to establish a data replication environment or to facilitate recovery from, e.g., network outages in such an environment, a snapshot may be employed to establish a point-in-time reference from which the site can (re)synchronize the failover data.

In the absence of continuous synchronous replication between the sites, the current state of the failover data at the secondary site always "lags behind" (is not synchronized with) that of the primary site resulting in possible data loss in the event of a failure of the primary site. If a specified amount of time lag in synchronization is tolerable (e.g., 60 minutes), then asynchronous (incremental) replication may be selected between the sites, for example, a point-in-time image replication from the primary site to the secondary site is not more than 60 minutes behind. Incremental replication generally involves at least two point-in-time images or snapshots of the failover data to be replicated, e.g., a base snapshot that is used as a reference and a current snapshot that is used to identify incremental changes to the data since the base snapshot. To facilitate efficient incremental replication in a data protection environment, a base snapshot is required at each site. Note that the failover data may include an entire state of a vdisk or virtual machine including associated storage objects.

Figure 4:
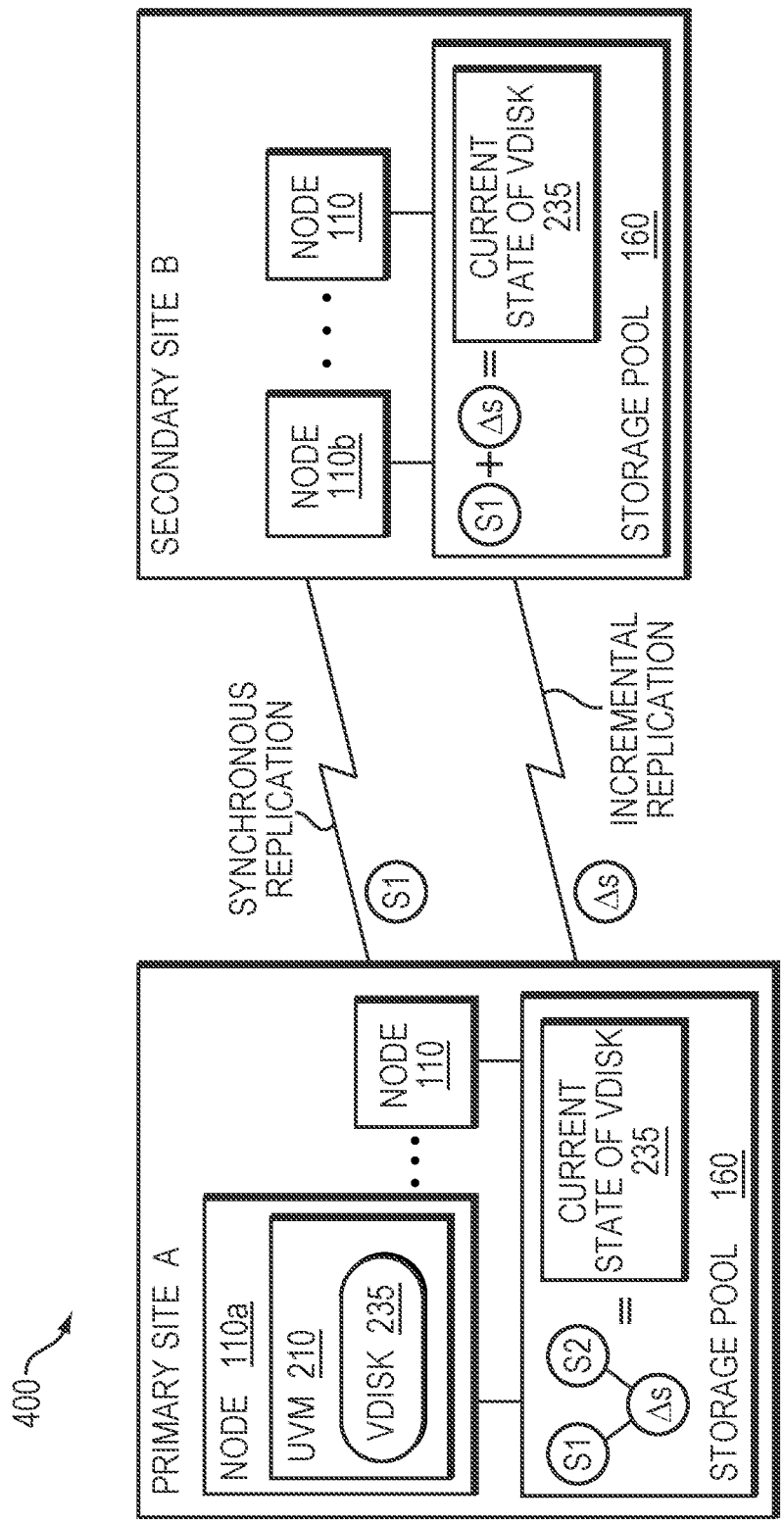
FIG. 4 is a block diagram of an exemplary data replication environment configured for use in various deployments such as disaster recovery (DR)

FIG. 4 is a block diagram of an exemplary data replication environment configured for use in various deployments, such as disaster recovery (DR). Illustratively, the environment 400 includes a primary site A and a secondary site B, wherein each site represents a datacenter embodied as a cluster 100 having one or more nodes 110. A category of data (e.g., a vdisk 235) on primary node 110*a* at primary site A is designated for failover to secondary site B (e.g., secondary node 110*b*) in the event of failure of primary site A. A first snapshot S1 of the failover data is generated at the primary site A and replicated (e.g., via a form of asynchronous snapshot replication) to secondary site B as a base or "common" snapshot S1. A period of time later, a second snapshot S2 may be generated at primary site A to reflect a current state of the failover data (e.g., vdisk 235). Since the common snapshot S1 exists at sites A and B, only incremental changes (deltas Δs) to the data designated for failover need be sent (e.g., via incremental replication) to site B, which applies the deltas (Δs) to S1 so as to synchronize the state of the vdisk 235 to the time of the snapshot S2 at the primary site.

A tolerance of how long before data loss will exceed what is acceptable determines (i.e., imposes) a frequency of snapshots and replication of deltas to failover sites, e.g., a data loss tolerance of 60 minutes requires snapshots with commensurate delta replication every 60 minutes (hourly)—deemed a Recovery Point Objective (RPO) of 60 minutes. Note that the specified amount of tolerable data loss depends on a periodicity of replication between the sites. For a periodicity of less than 15 minutes (e.g., RPO<15 mins), a form of incremental replication deemed as near synchronous (NearSync) replication may be employed that uses light weight snapshots (LWS) based on write operation logs (e.g., intent logs) prior to storing data at rest. Broadly stated, the LWS is created using a logged group of write operations (e.g., may not yet be stored at rest) that represents the current failover data of the vdisk at the primary site (organized as a file) which may be replicated to the secondary site in accordance with the specified RPO periodicity. In this manner, low RPOs may be accommodated with minimal network and computational overhead.

As noted, a base snapshot is required at each site to facilitate efficient incremental replication in a data protection environment. To that end, an administrator may configure a DR replication schedule that includes generation of a base or reference snapshot of a vdisk 235 at the source (primary) site and replication of the vdisk to the destination (secondary) site. Typically, incremental (e.g., NearSync) replication does not commence (start) until the base snapshot generation and subsequent replication has completed because the incremental snapshots are generated and applied in reference (as changes or deltas) to the base snapshot. For example, assume the base snapshot requires a relatively long time period (e.g., 20 hours) to replicate to the secondary site because of the relatively large size of the failover data (vdisk) to be protected. During the relatively long replication time period, subsequent write operations (i.e., after creation of the base snapshot) may be issued by a UVM 210 to the vdisk 235 and accumulated at the primary site. As a result, the accumulated write operations may be stored at the primary site awaiting replication to the secondary site, which requires a period of time (e.g., 6 hours) to generate and replicate during which additional writes are accumulated for a next replication to the secondary site and so on.

The embodiments described herein are directed to a framework configured to improve resource utilization during operations executing within workflows of a distributed data processing system in a DR environment. Illustratively, the distributed data processing system is configured as a plurality of nodes interconnected as one or more clusters having resources configured to support heterogeneous DR workflows. The system resources of the cluster include CPUs, memory and networks, whereas the heterogeneous DR workflows include snapshots, replication (e.g., synchronous, asynchronous (async), nearsync), migration and recovery of data objects, such as virtual disks and/or virtual machines. The data objects at a primary site of the DR environment are designated as one or more workloads associated with the workflows for failover (e.g., replication and/or migration) to a secondary site in the event of failure of the primary site. The framework is configured to control and regulate (meter) execution of the operations directed to the workloads so as to efficiently use the resources in a manner that allows timely progress (completion) of certain (e.g., high-frequency) operations and reduction in blocking (stalling) of other (e.g., low-frequency) operations by avoiding unnecessary resource hoarding/consumption and contention. That is, the metering regulates use of resources by predictive and real-time scheduling of operations to manage orderly resource consumption and avoid contention such as typically occurs in the "thundering herd" problem.

In an embodiment, the operations of the DR workflows are organized as jobs metered by a control plane process (e.g., replication manager) of the framework executing on a node of the cluster. The DR workflows have characteristics that are typically not deterministic with respect to time-to-completion given the limited resources that are available in the system. The framework defines various properties of each workload (e.g., virtual disks and/or virtual machines) associated with a workflow: (i) load, e.g., a number of virtual disks to be replicated and/or a total amount of changes to be replicated, (ii) priority, e.g., replication priority relative to similar operations having different latency/criticality criteria, wherein the replication priority may be related to a DR constraint, such as recovery point objective (RPO) associated with a job, and (iii) flow identification, e.g., an identifier (ID) associated with a flow and representing a partition (physical or virtual), such as a secondary site or network, having independent system capacity for handling the workloads. As used herein, the flow/partition could be a physical or logical (virtual) independent grouping (i.e., portion) of system resources required by the workflow, such as first resources needed to generate snapshots at a primary node of a primary site. Each of the flow/partitions are separate such that they can be managed independently without conditions. For example, the first resources needed by the primary node do not impact second resources needed by a secondary node to generate snapshots at a secondary site and, thus, those first resources may be partitioned as a flow from other system resources.

In an embodiment, a load (workload) is associated with a workflow. For example, assume the workload is replication and transmission of a virtual machine (e.g., a VM), wherein the VM includes a number of virtual disks (vdisks) and wherein each vdisk is a file. The load is thus the number of files to be replicated. A large VM may include 10 files whereas a small VM may include 5 files. The metering framework may estimate (predict) a load for the workflow based on resources and time needed for completion (e.g., amount of data to replicate and available bandwidth) and schedule the workflow accordingly, for example based on the size of the load. In another embodiment, the load may be based on a total amount of data changes or differentials (deltas) between snapshots associated with the workflow (e.g., an asynchronous replication).

Illustratively, for purposes of scheduling the notion of a load is relative, i.e., a comparative (not absolute) load, for the metering framework. For example, if 10 vdisks of a first VM are to be replicated and 5 vdisks of a second VM are to be replicated, the second VM has half the load of the first VM. Assume that there is a constant change occurring to the vdisks (files) and that the asynchronous (async) replication of deltas occurs periodically. Thus, for a first async workflow that occurs every 4 hours, the total amount of deltas (changes) to the vdisks that is replicated reflects the last 4 hours of changes, whereas for a second async workflow that occurs every 1 hour, only about 25% of the total amount of changes of the first async workflow as a comparison is replicated. Such relative metering of load provides efficient resource utilization so as to enable the framework to operate slightly over-subscribed with respect to resource consumption to ensure that the system is always nearly fully loaded at the cost of slightly higher resource consumption because, e.g., workflows that are waiting to run (execute) do not unnecessarily consume system resources (e.g., memory) without performing useful work. That is, blocked workflows are prevented from holding significant unused resources that may be better utilized by other workflows.

Figure 5:
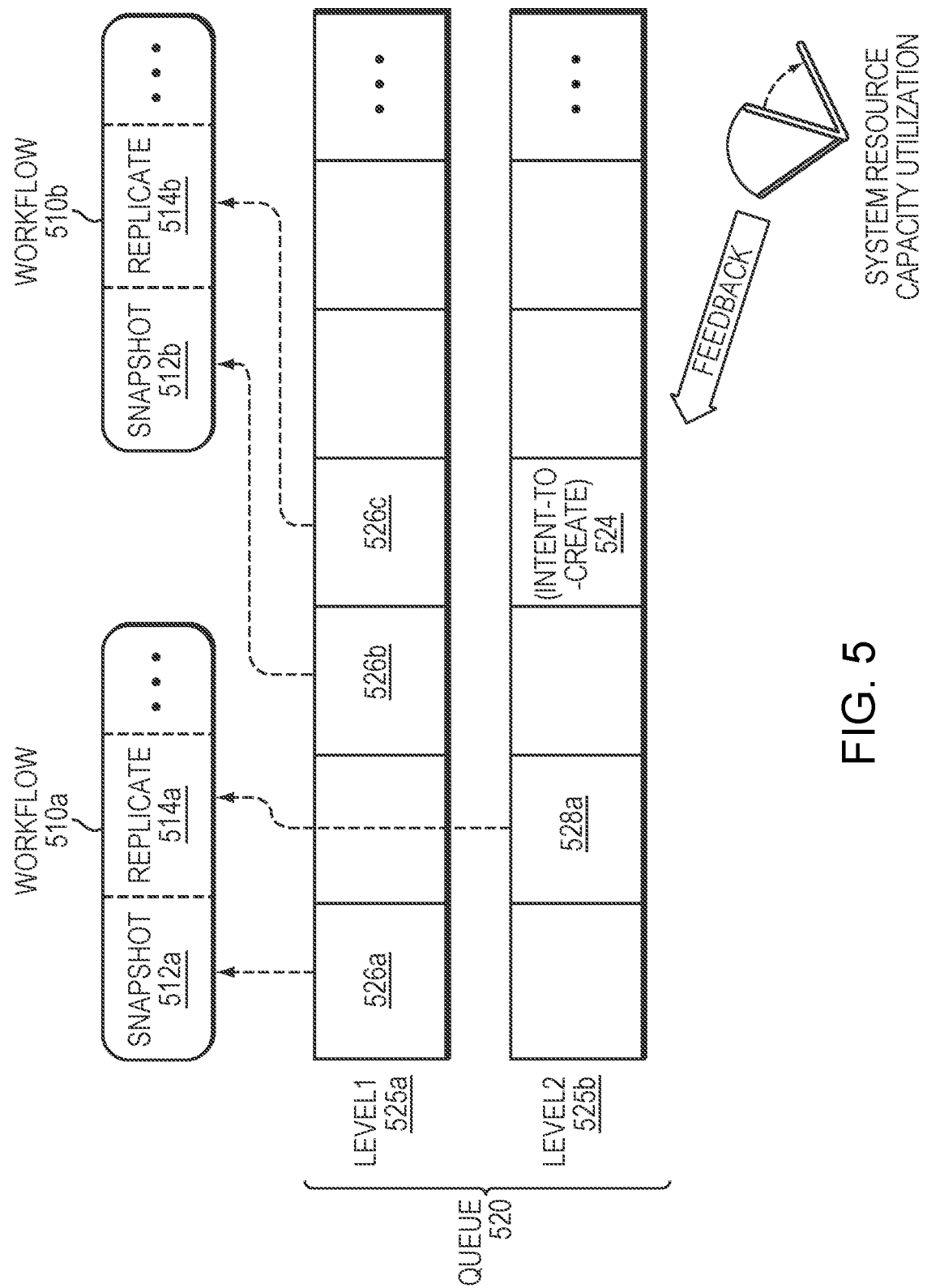
FIG. 5 is a block diagram of an exemplary framework for improving resource utilization for a DR environment.

FIG. 5 is a block diagram of an exemplary framework for improving resource utilization for the DR environment. Illustratively, the replication manager includes customizable logic (e.g., program instructions) configured to monitor data structures organized as one or more queues 520 and a list of references to the queues. Each queue, e.g., a double-ended queue, holds references (dashed lines) to pending workflow operations for a flow ID (not shown), whereas each element of the list represents a set of operations sharing the same flow ID. The queues and list cooperate to provide a flow queue, i.e., a queue for a given flow ID. A vector of the flow queue may be implemented as a priority queue, wherein each element of the priority queue vector represents a flow queue with specific priority. Each flow queue element in the priority queue is associated with an allowed maximum quota of resource usage that is based on priority associated with a percentage of the total system bandwidth.

References to operations for workflows $510a,b$ metered by the replication manager may be modeled by the framework as top-level, meta-operations that are organized and distributed among nodes of the cluster for processing as lower-level lifecycle operations (jobs). Metering occurs at the meta-operation level $510a,b$ to ensure that once committed, the meta-operation can spawn (instantiate) the lower-level lifecycle operations to run to completion without contention for system resources. For instance, there may be various lifecycle operations associated with different stages ($512a,b$ and $514a,b$) of a DR workflow embodied as a "data protection" meta-operation for safeguarding a workload, such as vdisks of a VM. Here, the lifecycle operations of each stage may be associated with a workflow, such as snapshot, replication, and recovery. For example, there may be a snapshot stage $512a,b$ for the one or more vdisks (files) which may involve a plurality of snapshot operations for the files that are each metered according to the properties such flow ID, priority and load (cost) of each snapshot operation. Another stage may be replication $514a,b$, where copies of the snapshotted files may be replicated to one or more secondary sites. Each replication workflow may be associated with a load/cost of transmission (available network bandwidth), e.g., replication to one secondary site over a slow network and to another secondary site over a faster network, wherein system resources may be apportioned by flow according to the network/site connection available bandwidth.

Yet another stage (not shown) of the meta-operation may involve recovery for a disaster or planned failover of a workload from a primary site to a secondary site. Recovery may include actions (e.g., failover/migration) that occur concurrently across various workloads (e.g., VMs) and require a set of operations that need to be performed. For example, recovery of a VM may include operations such as (i) creation of the VM at the secondary site, (ii) registration of the VM with a hypervisor, and (iii) configuration of the VM including, e.g., attachment of networks and file systems to the VM. Since these operations require consumption of limited resources of the sites, the metering framework may be deployed to facilitate instantiation of the VM in a manner that does not cause contention of the system resources at the sites and result in blocking of operations.

The metering framework may utilize the properties of the workloads in a multi-level $525a,b$ hierarchical arrangement configured to regulate jobs and, more specifically, their use of resources according to access policy per level, e.g., fair (round robin), weighted (priority based), or first-in, first-out (FIFO). For example, the snapshot stage $512a,b$ of a DR workflow may have a weighted access policy based on priority at a first level and a fair access policy based on round robin selection of resources among equal priority jobs at a second level. That is, different policies may be applied at each level. The metering framework is also configured to ensure that available system resource bandwidth is used optimally, efficiently, and flexibly by, e.g., enabling use (borrowing) of available bandwidth for higher priority jobs from underutilized bandwidth of lower priority jobs. Borrowing of resource bandwidth may be implemented by overriding quotas, avoiding or limiting starvation as described herein.

The metering framework also uses priority and maximum quota capacities to reduce starvation (i.e., blocking) of short duration workflow operations by temporarily borrowing unused resources from lower priority, longer duration workflows. For example, workflows such as replications include high-priority replications that typically occur at a higher frequency (i.e., every 5 or 15 minutes) than low-priority replications (e.g., every hour or 6 hours). References to operations associated with these high-priority replications (workflows) are loaded into high-priority queues, while references to low-priority replication operations are loaded into low-priority queues. If there are many incoming high-priority replication operations that would exhaust maximum resource quota capacities for those operations in the high priority queues and there are not many low-priority replication operations pending in the low-priority queues, then quota capacities may be borrowed from the low-priority replication operations and allocated to the high-priority replication operations to ensure that the incoming high-priority replications are immediately serviced with available system resources. In contrast, if low-priority replication operations are pending in their queues waiting for system resources consumed by the high-priority replications, spare priority-independent resource capacity may be used to allow some of the low-priority replication operations (jobs) to proceed to avoid starvation.

In an embodiment, the metering framework may employ one or more multi-level queues configured to hold an "intent-to-create" meta-operation 524 and the actual meta-operation that is eventually created (instantiated). In this manner, the framework anticipates resources that will be needed to complete the meta-operation in future and prevents instantiation of the meta-operation until sufficient resources are available. The intent-to-create meta-operation is loaded into one level of the queue 525b and temporarily stored (held) until the actual meta-operation is instantiated and loaded into another level 525a of the queue. Once instantiated, the meta-operation consumes resources such as memory for allocated data structures and, significantly, has sufficient resources available to run to completion. In essence, the deployment of metering and queueing infrastructure of the framework prevents a "thundering herd" issue where many workflow operations compete all at once for the limited system resources resulting in blocking of operations such that no operation can make significant progress. Deployment of the framework infrastructure strives to match the system resources to the workloads that require processing in a manner that limits contention for the resources so that some amount of work is constantly completing. The framework also provides for high priority workflow operations to access to their required resources, while avoiding starvation of low priority workflows.

The framework further strives to reduce costs typically associated with queueing (buffering). A queue has a memory footprint consisting of elements/entries temporarily stored (pending) in the queue that consume at least that footprint. Moreover, partially completed operations pending in the queue may consume additional system resources that are retained as placeholders or "slots" for accessing those additional resources even when currently not in use. Metering strives to avoid the typical effects of queueing in the system by ensuring that, when loaded into a queue, the operations (or, more specifically, references to the operations) have sufficient resources available to perform the work required for the workflow. To that end, the framework may employ feedback (e.g., a feedback loop) to determine capacity of the system resources so as to allow operations of workflows to be loaded into the queues when there is available capacity. The feedback loop is illustratively implemented by the control plane process that is configured to determine the extent of backup in the queues and regulate loading of references to the operations in the queues when the resources are available so that the operations may complete without having to contend for the resources.

Illustratively, the metering framework functions as a scheduler ("gatekeeper") to regulate instantiation of operations (jobs) processed by the nodes of the cluster in a manner that ensures each job (when instantiated) has access to sufficient system resources to run to completion. To that end, the framework utilizes priority-based queuing, maximum quotas of resource usage, quota borrowing, and spare resource capacity to prevent blocking of jobs from lack of access to and availability of (starvation) required system resources. The scheduling function of the framework regulates premature instantiation of workflow operations, e.g., based on DR constraints and availability of resources, to prevent unnecessary consumption of resources. Once the workflow operations/jobs are instantiated, the framework scheduler manages the resources to ensure the jobs complete by, e.g., borrowing quota (bandwidth) capacity from other jobs based on feedback from monitoring the queues to determine the amount of resources, such as network bandwidth, actually consumed. Such feedback monitoring allows jobs of low-priority workflows to instantiate and complete during times of inactivity for jobs of high-priority workflows.

Essentially, the metering framework strives to optimize resource utilization of jobs based on the DR constraints (e.g., RPO, type of replication, etc), such that execution of a long-running, low-frequency job may be temporarily delayed (i.e., held-off) without violating its desired constraint (e.g., RPO) and still satisfy its priority assignment so as to allow instantiation of a short-running, high-frequency job to complete sooner. For example, if the low-frequency job has a period of inactivity, e.g., waiting for resources, then one or more high-frequency jobs may be instantiated and loaded into their queues to access available resources and quickly complete. Assume the low-frequency job is part of an async replication workflow and the high-frequency job is part of a nearsync replication workflow. The storage resources utilized by these workflows are different: async replication relies on vdisk-based snapshots, whereas nearsync relies on oplog-based lightweight snapshots. Assume also that the low frequency, async job has 10 files to replicate but that after replication 2 of the files, the job is blocked because, e.g., the next 8 files are not ready to replicate. In such as case, the framework scheduler may instantiate one or more high frequency (e.g., every 60 minutes or less) nearsync jobs to execute and access the different storage resources that are not utilized by the async job.

The framework also maintains persistent state of operation progress, e.g., workflow operations that are loaded into queues, instantiated, and executing, as well as the amount of resources consumed by the executing operations. Such state is advantageously utilized in the event of a system crash so that during recovery, the framework may restore the workflow operations to the state of the system before the crash and continue operation processing.

In an embodiment, the properties of a workload associated with a workflow may be tuned based on system resources of the clusters. For example, if a new node or network is introduced (configured) to the cluster, the capacity of available resources may increase. Accordingly, the types and/or number of workloads processed by the cluster may increase which, in turn, may positively impact the priorities of the workloads. Similarly, removal of a node or network from the cluster may reduce the capacity of available resources and have a corresponding negative impact on the properties of the workloads, such as increasing time to completion. For example, the framework may determine the priority and flow ID of an incoming workflow meta-operation and load a reference to the incoming (pending) operation into a flow queue of the determined priority.

Advantageously, the framework described herein improves resource utilization during operations executing within workflows of the distributed data processing system (e.g., having a plurality of interconnected nodes) in a DR environment configured to support synchronous and asynchronous (i.e., heterogeneous) DR workflows (e.g., generating snapshots and replicating data) that include synchronous replication, asynchronous replication, nearsync (i.e., short duration snapshots of metadata) replication and migration of data objects associated with the workflows for failover (e.g., replication and/or migration) to a secondary site in the event of failure of the primary site. The framework meters (regulates) execution of the operations directed to the workloads so as to efficiently use the resources in a manner that allows timely progress (completion) of certain (e.g., high-frequency) operations and reduction in blocking (stalling) of other (e.g., low-frequency) operations by avoiding unnecessary resource hoarding/consumption and contention. That is, the metering regulates use of resources by predictive and real-time scheduling of operations to manage orderly resource consumption and avoid contention such as typically occurs in the "thundering herd" problem. Notably, the framework also provides metering and tuning of properties during execution of the workflows and maintains their state to provide for recovery.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    estimating a load of a first disaster recovery (DR) workflow based on priority and system resources needed for completion in a multi-site DR environment;
    loading an intent-to-create meta-operation into a first level of a queue based on the estimated load of the first DR workflow;
    instantiating the first DR workflow from the intent-to-create meta-operation based on a first access policy associated with the first level of the queue;
    loading the first DR workflow in the first level of the queue for execution when the system resources needed for completion of the first DR workflow are available; and
    metering use of the system resources for the first DR workflow based on the estimated load to permit completion of a shorter duration second DR workflow.

2. The method of claim 1, further comprising:
    borrowing a system resource quota capacity from the first DR workflow of the first level of the queue for use by the second DR workflow.

3. The method of claim 1, wherein execution of the first DR workflow is delayed without violating a recovery point objective.

4. The method of claim 1, wherein the first access policy applied to the first level of the queue is different from a second access policy applied to a second level of the queue.

5. The method of claim 1, wherein the first DR workflow has multiple stages including a snapshot stage and data replication stage, and wherein the first level of the queue applies to the snapshot stage and a second level of the queue applies to the data replication stage.

6. The method of claim 1, wherein the first DR workflow is an asynchronous replication based on incremental changes between snapshots.

7. The method of claim 1, wherein the load of the first DR workflow is calculated as relative to loads of other DR workflows.

8. The method of claim 1, wherein the system resources include network bandwidth between sites of the multi-site DR environment.

9. The method of claim 1, further comprising employing feedback to determine capacity of the system resources for queuing of the first DR workload.

10. A non-transitory computer readable medium including program instructions for execution on a processor, the program instructions configured to:
    estimate a load of a first disaster recovery (DR) workflow based on priority and system resources needed for completion in a multi-site DR environment;
    load an intent-to-create meta-operation into a first level of a queue based on the estimated load of the first DR workflow;
    instantiate the first DR workflow from the intent-to-create meta-operation based on a first access policy associated with the first level of the queue;
    load the first DR workflow in the first level of the queue for execution when the system resources needed for completion of the first DR workflow are available; and
    meter use of the system resources for the first DR workflow based on the estimated load to permit completion of a shorter duration second DR workflow.

11. The non-transitory computer readable medium of claim 10 wherein the program instructions for execution on a processor are further configured to:
    borrow a system resource quota capacity from the first DR workflow of the first level of the queue for use by the second DR workflow.

12. The non-transitory computer readable medium of claim 10, wherein execution of the first DR workflow is delayed without violating a recovery point objective.

13. The non-transitory computer readable medium of claim 10, wherein the first access policy applied to the first level of the queue is different from a second access policy applied to a second level of the queue.

14. The non-transitory computer readable medium of claim 10, wherein the first DR workflow has multiple stages including a snapshot stage and data replication stage, and wherein the first level of the queue applies to the snapshot stage and a second level of the queue applies to the data replication stage.

15. The non-transitory computer readable medium of claim 10, wherein the first DR workflow is an asynchronous replication based on incremental changes between snapshots.

16. The non-transitory computer readable medium of claim 10, wherein the load of the first DR workflow is calculated as relative to loads of other DR workflows.

17. The non-transitory computer readable medium of claim 10, wherein the program instructions for execution on a processor are further configured to employ feedback to determine capacity of the system resources for queuing of the first DR workload.

18. An apparatus comprising:
a replication manager of a node in a cluster of interconnected nodes of a multi-site DR environment, the replication manager running on the node having a processor configured to execute program instructions to,
estimate a load of a first disaster recovery (DR) workflow based on priority and system resources needed for completion in the DR environment;
load an intent-to-create meta-operation into a first level of a queue based on the estimated load of the first DR workflow;
instantiate the first DR workflow from the intent-to-create meta-operation based on a first access policy associated with the first level of the queue;
load the first DR workflow in the first level of the queue for execution when the system resources needed for completion of the first DR workflow are available; and
meter use of the system resources for the first DR workflow based on the estimated load to permit completion of shorter duration second DR workflow.

19. The apparatus of claim 18 wherein the program instructions further include program instructions to:
borrow a system resource quota capacity from the first DR workflow of the first level of the queue for use by the second DR workflow.

20. The apparatus of claim 18, wherein execution of the first DR workflow is delayed without violating a recovery point objective.

21. The apparatus of claim 18, wherein the first access policy applied to the first level of the queue is different from a second access policy applied to a second level of the queue.

22. The apparatus of claim 18, wherein the first DR workflow has multiple stages including a snapshot stage and data replication stage, and wherein the first level of the queue applies to the snapshot stage and a second level of the queue applies to the data replication stage.

23. The apparatus of claim 18, wherein the first DR workflow is an asynchronous replication based on incremental changes between snapshots.

24. The apparatus of claim 18, wherein the load of the first DR workflow is calculated as relative to loads of other DR workflows.

25. The apparatus of claim 18, wherein the system resources include network bandwidth between sites of the multi-site DR environment.

26. The apparatus of claim 18, wherein the program instructions further include program instructions to employ feedback to determine capacity of the system resources for queuing of the first DR workload.

* * * * *